INVENTORS
FRANK W. BROOKS
JAMES O. HELVERN
BY *A. C. Staley*
THEIR ATTORNEY

United States Patent Office 3,172,335
Patented Mar. 9, 1965

3,172,335
POWER BRAKE BOOSTER
Frank W. Brooks, Dayton, and James O. Helvern, Lewisburg, Ohio, assignors to General Motors Corporation, Detroit, Mich., a corporation of Delaware
Filed Aug. 7, 1961, Ser. No. 129,756
7 Claims. (Cl. 91—369)

This invention relates to brake boosters for power actuation of the brakes of a motor vehicle.

An object of the invention is to provide a power brake booster wherein the movable wall in the casing of the power unit is fully resiliently supported.

Another object of the invention is to provide a power brake booster wherein a movable wall of the power casing includes a rolling diaphragm between the movable wall and the power casing and wherein the movable wall is resiliently supported for reciprocal movement in the power casing by means of resilient elastomeric seal members provided in opposite walls of the power casing so that the movable wall will be guided and supported resiliently by the elastomeric seal members in its stroke of reciprocation in the power casing.

Further objects and advantages of the present invention will be apparent from the following description, reference being had to the accompanying drawings wherein preferred embodiments of the present invention are clearly shown.

Figure 1:
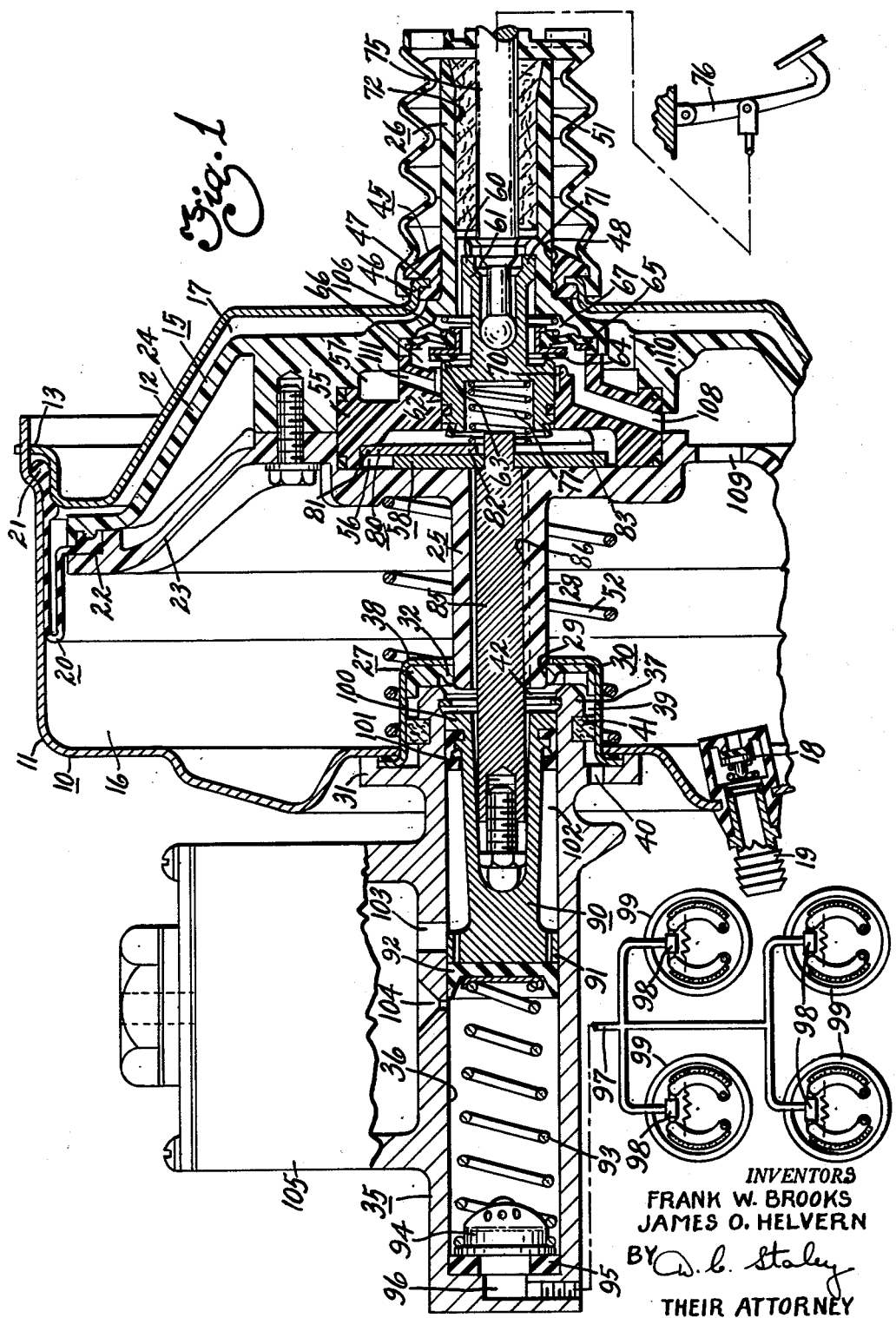
FIGURE 1 is a longitudinal cross-sectional view of a power brake booster incorporating features of this invention and illustrating the brake booster in a retracted or inactive position.
Figure 2:
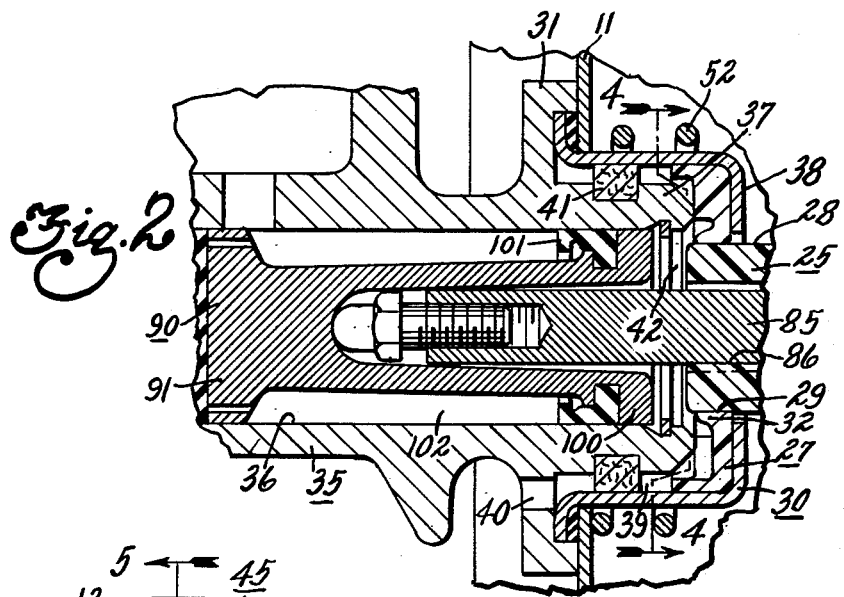
FIGURE 2 is an enlarged cross-sectional view of a portion of FIGURE 1 illustrating the support of one end of the movable wall of the brake booster in a resilient elastomeric seal member.
Figure 3:
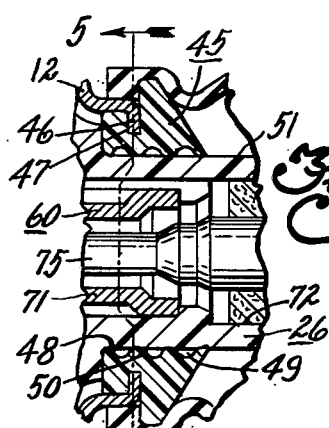
FIGURE 3 is an enlarged cross-sectional view of another portion of FIGURE 1 illustrating the support of the opposite end of the movable wall of the brake booster in a resilient elastomeric seal member.
Figure 4:
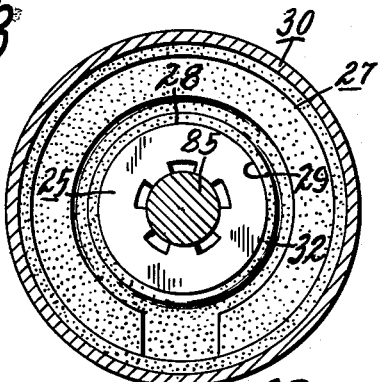
FIGURE 4 is a transverse cross-sectional view taken along line 4—4 of FIGURE 2.
Figure 5:
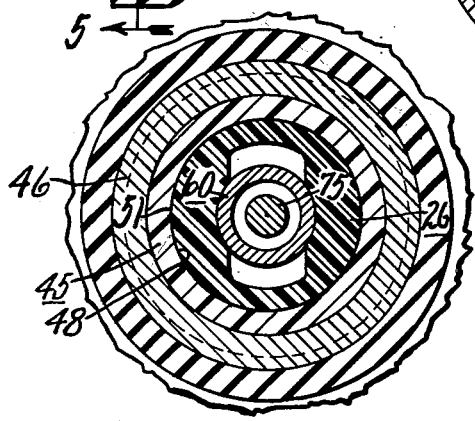
FIGURE 5 is a transverse cross-sectional view taken along line 5—5 of FIGURE 3.

The power brake booster of this invention includes a power casing 10 comprising two shell members 11 and 12 secured together by a bayonet lock arrangement 13. The casing 10 includes a pressure differential responsive movable wall 15 that divides the power casing into two compartments 16 and 17 at opposite sides of the movable wall 15. The compartment 16 is a constant pressure compartment whereas the compartment 17 is a variable pressure compartment varying from subatmospheric pressure, or vacuum, to atmospheric pressure, compartment 16 being connected with a suitable source of subatmospheric pressure, or vacuum, such as the manifold of an engine of a vehicle on which the device is placed through means of a suitable check valve 18 and a conduit fitting 19.

The compartments 16 and 17 are separated one from the other by means of a rolling diaphragm 20 that has its outer peripheral edge 21 secured between the shells 11 and 12, the inner peripheral edge 22 being secured between the wall members 23 and 24 of the movable wall 15 thereby sealing the edges of the diaphragm against fluid flow between the compartments 16 and 17.

The rolling diaphragm 20 provides a compartment separation wall that has a minimum amount of frictional resistance to movement of the movable wall 15 and provides for substantial freedom of movement of the movable wall, but which diaphragm provides little or no support for the movable wall in its reciprocal movement in the casing 10.

Axial support for the movable wall 15 is occasioned by the cylindrical projections 25 and 26 that extend from opposite sides of the wall 15. The projection 25 extends through the subatmospheric compartment or chamber 16 through a seal member 27 that is made of an elastomeric material, such as rubber or synthetic rubber such as neoprene or duprene, or of a resilient plastic material having characteristics of bodily resilience, to effect a sealing engagement with the cylindrical peripheral surface 28 of the projection or extension 25 that passes through an opening 29 in the seal member 27.

The seal member 27 is in the form of an annulus seated within a cup member 30 which in turn is secured to the wall member 11 by means of a flange member 31 that forms a part of the master cylinder 35, suitable fastening devices such as screws or bolts securing the flange 31 to the wall member 11. The inner peripheral portion of the seal member 27 has a flexible annular lip 32 that engages the periphery 28 of the projection 25 to prevent fluid flow along the periphery of the projection.

The master cylinder 35 has the cylinder bore 36 that terminates in the annular end portion 37 that engages the forward face of the seal member 27 so as to retain the seal member between the end portion 37 of the master cylinder and the radial flange portion 38 of the cup member 30. An annular space or chamber 39 is provided between the axial annular portion of the cup 30 and the end portion 37 of the master cylinder for admission of atmospheric air through the port 40, the air being filtered by the air filter 41 so that the forward or left-hand face of the seal member 27 is exposed to atmospheric pressure with the result that subatmospheric pressure present in chamber 16 will be broken at the chamber 42 provided at the rear end of the master cylinder bore 36.

The projection portion 26 on the opposite side of the movable wall 15 extend through a seal member 45 that is made of a material comparable to that of the material of which seal member 27 is constructed so as to resiliently support the projection 26 by the seal member 45.

The seal member 45 is carried on the shell 12 by means of radially flanged portion 46 fitting within a grooved portion 47 in the seal member 45. The seal member 45 has the inner peripheral surface of an opening 48 provided with annular grooves 49 adapted to retain a lubricating material therein, the ridges 50 of the grooves 49 engaging the peripheral surface 51 of the extension 26 to sealingly engage the surface and prevent fluid leakage to or from the chamber 17 of the brake booster. The seal member 27 can have similar grooves, if desired.

From the foregoing description, it will be apparent that the sole support for the movable wall 15 of the brake booster consists of the two resilient seal members 27 and 45 that are made of a resilient material, such as an elastomeric substance or a plastic material, the seal members 27 and 45 providing the support in which projections 25 and 26 reciprocate when the movable wall 15 reciprocates within the casing 10 as a result of pressure differential being applied to opposite sides of the movable wall. It will also be noted that the extensions 25 and 26 of the movable wall 15 are coaxial with each other and with the movable wall as well as being coaxial with the casing 10 so that the unit can be constructed in a concentric manner.

The movable wall 15 is retained in the position shown in FIGURE 1 of the drawings by means of the compression spring 52 in the normal retracted position of the booster unit.

The wall 15 is provided with an internal chamber that receives a partitioning carrier member 55 that divides the interior chamber of the wall 15 into the two compartments 56 and 57, compartment or chamber 56 containing a reaction transmission means 58 while the compartment or chamber 57 receives a follow-up control valve mechanism 60 which controls admission of atmospheric air or of subatmospheric pressure or vacuum to the chamber 17 to regulate pressure differential on opposite sides of the movable wall 15 and thereby power actuate the wall for forward advancement of the same.

The follow-up control valve mechanism 60 consists of a valve seat member 61 reciprocably slidable in an axial bore 62 provided in the carrier member 55 and having an air valve seat 63 engaging a valve element 64. Valve element 64 is supported on a flexible diaphragm 65 having the inner periphery secured to the valve element 64 and the outer periphery secured between the wall 15 and the carrier 55 for separation of chamber 66 from chamber 67 on movement of the valve element between the air valve seat 63 and the vacuum valve seat 70 provided on the carrier member 55 as an annulus around the valve seat member 60, air valve seat 63 also being an annulus on the member 60.

The valve seat member 60 has an extension 71 projecting into a central axial bore 72 provided in the projection 26 on the movable wall 15, which extension receives the inner end of an actuating member 75 connected by suitable linkage to the brake pedal 76.

A spring 77 normally holds the valve seat member 60 in the position shown in FIGURE 1 with the air valve seat 63 engaging valve element 64 and holding valve element 64 out of engagement with the vacuum valve seat 70. The opposite end of spring 77 engages a plurality of reaction levers 80 having their outer ends 81 pivotally supported on the carrier member 55 and their inner ends 82 adapted for engagement with the inner end of the valve seat member 60 when the inner ends are moved in a right-hand direction by means of the reaction disc 83 carried on the inner end of the power transmission member or rod 85.

The power transmission member 85 is slidably received in an axial bore 86 provided in the extension 25 of the movable wall 15, axial bore 86 preferably being in the form of a spline arrangement to reduce friction to movement of the member 85 in the bore 86.

The forward end of the power transmission member 85 engages the master cylinder piston 90 slidably received in the master cylinder bore 36 of the master cylinder. The forward end 91 of the master cylinder piston engages a cup seal 92 held against the piston end 91 by means of a compression spring 93. The opposite end of the compression spring engages a residual pressure check valve 94 normally held on a resilient seat element 95 for regulating retention of pressure in the outlet passage 96 and the brake line conduits 97 connected with the wheel cylinders 98 of the brakes 99. The rear end 100 of the master cylinder piston 90 carries a secondary seal 101 by which fluid is prevented from escaping from the annular chamber 102 provided between the ends 100 and 91 of the piston 90, chamber 102 connecting with the reservoir 105 by means of a port 103 in the bottom wall of the reservoir. A second filling port 104 is provided in the bottom wall of the reservoir that is just forward of the cup seal 92 when the master cylinder piston is in the retracted position shown in FIGURE 1 of the drawings.

In operation, when the operator of the vehicle moves the brake pedal 76, plunger 75 is moved forward, in a leftward direction as viewed in the drawing, to move the valve seat member 60 in a left-hand direction with valve element 64 following the member 60 by urgence of the spring 106 until the valve element engages vacuum seat 70 thereby closing chamber 66 from communication with chamber 16 that was previously established through the passage 108 and the port 109 and thereby cutting off supply of subatmospheric pressure or vacuum to chamber 17 that had previously been conducted to the chamber from chamber 57 through the port 110 in the wall 24.

Further advancement of the member 60 in a left-hand direction allows the valve element 64 to remain seated on vacuum seat 70 and air valve seat 63 will be disengaged from valve element 64 so that atmospheric air in chamber 67 can then pass through the port 111 into chamber 57 and thence through port 110 to chamber 17 to provide pressure for movement of the movable wall 15 in a left-hand direction. This movement of the wall 15 causes power plunger 85 to move master cylinder piston 90 in a left-hand direction in the master cylinder and thereby effect displacement of fluid under pressure from the master cylinder into the wheel cylinders of the brakes. Concurrently creation of hydraulic fluid pressure in the master cylinder bore 36 causes a reaction force on the power plunger 85 tending to move reaction disc 83 in a right-hand direction as viewed in FIGURE 1 against the reaction levers 80 to pivot them about their outer ends 81 and thereby effect engagement of the inner ends with the member 60 which transmits reaction or brake "feel" to the plunger 75, thereby giving the operator the feeling of applying the brakes.

It will be seen in all operations of the brake booster of this invention that movable wall 15 is carried solely by the resilient seal members 27 and 45 so as to give minimum resistance to movement of the movable wall, diaphragm 20 also forming a part of the support structure for the movable wall and separating chambers 16 and 17 from one another.

While the embodiments of the present invention as herein disclosed constitute preferred forms, it is to be understood that other forms might be adopted.

What is claimed is as follows:

1. A brake booster mechanism, including, a fluid pressure operated motor including a casing having a pressure differential responsive movable wall supported therein including a rolling diaphragm between the wall and the casing providing for reciprocable movement of the wall in the casing, said wall having an extension member projecting from each of opposite sides thereof, said casing having an elastomeric fluid seal member in each of opposite walls thereof respectively receiving the said extensions for reciprocation therein and providing with said diaphragm the sole support of said wall.

2. A brake booster mechanism, including, a fluid pressure operated motor including a casing having a pressure differential responsive movable wall supported therein including a rolling diaphragm between the wall and the casing providing for reciprocable movement of the wall in the casing, said wall having an extension member projecting from each of opposite sides thereof in coaxial alignment and coaxial with said wall, said casing having an elastomeric fluid seal member in each of opposite walls thereof in coaxial alignment and coaxial with said casing and said wall respectively receiving the said extensions for reciprocation therein and providing with said diaphragm the sole support of said wall for coaxial reciprocation thereof in said casing.

3. A brake booster mechanism, including, a fluid pressure operated motor including a casing having a pressure differential responsive movable wall supported therein including a rolling diaphragm between the wall and the casing providing for reciprocable movement of the wall in the casing, a follow-up control valve means and reaction transfer means carried on said wall, said wall having an extension member projecting from each of opposite sides thereof, said casing having an elastomeric fluid seal member in each of opposite walls respectively receiving the said extensions extending through the said seal members to the exterior of said casing at opposite sides thereof for reciprocation therein and providing with said diaphragm the sole support of said wall, an actuating member extending through one of said extensions into operable connections with said follow-up control valve means, and a power transmission member extending through the other of said extensions into operable connection with said reaction transmission means.

4. A brake booster mechanism constructed and arranged in accordance with the structure set forth in claim 3 wherein the said extensions on said wall and said seal members in said casing walls and said actuating member and said power transmission member are all in coaxial alignment one with the other and coaxial with the said movable wall and said casing.

5. A brake booster mechanism, including, a fluid pressure operated motor including a casing having a pressure differential responsive movable wall supported therein including a rolling diaphragm between the wall and the casing providing for reciprocable movement of the wall in the casing, said casing having generally parallel spaced walls positioned at opposite sides of said movable wall, each of said casing walls having an elastomeric fluid seal member carried thereby and provided with coaxially aligned openings therein, said movable wall having a cylindrical projection extending from each of opposite sides thereof through the respective seal members in the said openings therein and supported by the said seal members with the said projections in sliding sealing engagement with the said openings in the said seal members, each of the said projections on said movable wall having an axial length sufficient to provide for full reciprocal stroke of movement of said movable wall in said casing whereby said projections support said movable wall in said casing in said seal members in the full stroke of reciprocation of said movable wall in said casing, said seal members together with said diaphragm providing the sole support of said movable wall.

6. A brake booster mechansim, including, a fluid pressure operated motor including a casing having a pressure differential responsive movable wall supported therein including a rolling diaphragm between the wall and the casing providing for reciprocable movement of the wall in the casing, said casing including wall members positioned at opposite sides of said movable wall, a resilient elastomeric seal member in each of said wall members in coaxial alignment and coaxial with said movable wall and having coaxial cylindrical openings therein, a cylindrical projection extending from each of opposite sides of said movable wall coaxial therewith and slidably sealingly received in said openings in said seal members for resilient sole support thereby of said movable wall in reciprocation in said casing.

7. A brake booster mechanism, including, a fluid pressure operated motor including a casing having a pressure differential responsive movable wall supported therein including a rolling diaphragm between the wall and the casing providing for reciprocable movement of the wall in the casing, said casing including wall members positioned at opposite sides of said movable wall, a resilient elastomeric seal member in each of said wall members in coaxial alignment and coaxial with said movable wall and having coaxial cylindrical openings therein, a cylindrical projection extending from each of opposite sides of said movable wall coaxial therewith and slidably sealingly received in said openings in said seal members for resilient sole support thereby of said movable wall, a follow-up control valve means and reaction transfer means carried on said movable wall, said projections on said movable wall each having an axial bore extending through the same, an actuating member extending through the axial bore in one of said projections into operable connection with said follow-up control valve means, and a power transmission member extending through the axial bore of the other of said projections into operable connection with said reaction transmission means.

References Cited in the file of this patent

UNITED STATES PATENTS

| | | |
|---|---|---|
| 2,861,427 | Whitten | Nov. 25, 1958 |
| 2,883,370 | Stelzer | Apr. 28, 1959 |
| 2,884,905 | Jensen | May 5, 1959 |
| 2,997,028 | Ayers | Aug. 22, 1961 |